US011861302B2

(12) United States Patent
Jensen

(10) Patent No.: US 11,861,302 B2
(45) Date of Patent: Jan. 2, 2024

(54) AUF XML SPECIFICATION COMPILER

(71) Applicant: Arthur Dale Jensen, Grand Forks, ND (US)

(72) Inventor: Arthur Dale Jensen, Grand Forks, ND (US)

(73) Assignee: Aatrix Software, Inc., Grand Forks, ND (US)

( * ) Notice: Subject to any disclaimer, the term of this patent is extended or adjusted under 35 U.S.C. 154(b) by 0 days.

(21) Appl. No.: 16/780,000

(22) Filed: Feb. 3, 2020

(65) Prior Publication Data

US 2021/0264103 A1  Aug. 26, 2021

Related U.S. Application Data

(60) Provisional application No. 62/800,865, filed on Feb. 4, 2019.

(51) Int. Cl.
*G06F 40/186* (2020.01)
*G06Q 40/12* (2023.01)
*G06F 40/174* (2020.01)

(52) U.S. Cl.
CPC .......... *G06F 40/186* (2020.01); *G06F 40/174* (2020.01); *G06Q 40/123* (2013.12)

(58) Field of Classification Search
CPC .................................................. G06F 40/186
See application file for complete search history.

(56) References Cited

U.S. PATENT DOCUMENTS

| 5,001,769 A | 3/1991 | Reid-Green et al. |
| 5,025,396 A | 6/1991 | Parks et al. |
| 5,060,980 A | 10/1991 | Johnson et al. |
| 5,140,650 A | 8/1992 | Casey et al. |
| 5,222,211 A | 6/1993 | Mueller et al. |
| 5,228,100 A * | 7/1993 | Takeda et al. ........... G06K 9/20 |
| 5,235,654 A | 8/1993 | Anderson et al. |
| 5,367,619 A * | 11/1994 | Dipaolo et al. ......... G06F 15/62 |
| 5,404,294 A * | 4/1995 | Karaik .................... G06F 15/40 |
| 5,495,565 A | 2/1996 | Millard et al. |
| 5,721,940 A | 2/1998 | Luther et al. |
| 5,742,836 A | 4/1998 | Turpin et al. |
| 5,745,712 A | 4/1998 | Turpin et al. |
| 5,826,269 A | 10/1998 | Hussey |
| 5,832,100 A | 11/1998 | Lawton et al. |
| 5,857,034 A | 1/1999 | Tsuchiya et al. |
| 5,872,640 A | 2/1999 | Cohen et al. |
| 5,963,966 A | 10/1999 | Mitchell et al. |
| 5,987,231 A | 11/1999 | Fong et al. |

(Continued)

FOREIGN PATENT DOCUMENTS

| JP | S61118872 | 6/1986 |
| JP | H0795372 | 4/1995 |

(Continued)

OTHER PUBLICATIONS

Padova in "Acrobat PDF Bible" Published 1999 by IDF Books, Foster City, California USA OD pp. 1-116.

(Continued)

*Primary Examiner* — James J Debrow
(74) *Attorney, Agent, or Firm* — Daniel A. Rosenberg; Taft Stettinius & Hollister LLP

(57) ABSTRACT

The present invention relates to a method and apparatus for automating the process of form creation. In particular, the present invention relates to a method and apparatus for implementing an independent and standardized way to create new data records and data types, and amend existing data records and types, in a computerized form creation and processing system.

13 Claims, 2 Drawing Sheets

AUF Builder Record Editor

(56) References Cited

U.S. PATENT DOCUMENTS

| | | | |
|---|---|---|---|
| 6,026,187 | A | 2/2000 | Siegel |
| 6,026,437 | A | 2/2000 | Muschett et al. |
| 6,043,819 | A | 3/2000 | LeBrun et al. |
| 6,163,771 | A | 12/2000 | Walker et al. |
| 6,182,075 | B1 | 1/2001 | Hsu et al. |
| 6,182,142 | B1 | 1/2001 | Win et al. |
| 6,192,380 | B1 | 2/2001 | Light et al. |
| 6,199,079 | B1 | 3/2001 | Gupta et al. |
| 6,249,866 | B1 | 6/2001 | Brundrett et al. |
| 6,330,073 | B1 | 12/2001 | Sciallo |
| 6,345,278 | B1 | 2/2002 | Hitchcock et al. |
| 6,400,845 | B1 | 6/2002 | Volino |
| 6,446,048 | B1 | 9/2002 | Wells et al. |
| 6,711,554 | B1 | 3/2004 | Salzmann et al. |
| 6,886,136 | B1 | 4/2005 | Zlotnick et al. |
| 6,910,179 | B1 | 6/2005 | Pennell et al. |
| 6,959,414 | B1* | 10/2005 | Kakehashi ............. G06F 15/00 |
| 6,961,902 | B2 | 11/2005 | Anecki et al. |
| 7,171,615 | B2 | 1/2007 | Jensen et al. |
| 7,203,699 | B2 | 4/2007 | Bellamy |
| 7,287,008 | B1 | 10/2007 | Mahoney et al. |
| 7,376,891 | B2 | 5/2008 | Hitchcock et al. |
| 7,487,438 | B1 | 2/2009 | Withers |
| 7,561,734 | B1* | 7/2009 | Waek ....................... G06K 9/62 |
| 7,607,078 | B2 | 10/2009 | Geva et al. |
| 7,669,116 | B2 | 2/2010 | Lopata et al. |
| 2001/0054046 | A1 | 12/2001 | Mikhailov et al. |
| 2002/0111888 | A1 | 8/2002 | Stanley et al. |
| 2002/0120628 | A1 | 8/2002 | Hitchcock et al. |
| 2002/0154334 | A1 | 10/2002 | Laverty et al. |
| 2002/0194219 | A1* | 12/2002 | Bradley et al. ......... G06F 15/00 |
| 2003/0110443 | A1 | 6/2003 | Yankovich et al. |
| 2003/0120516 | A1 | 6/2003 | Perednia |
| 2003/0233296 | A1 | 12/2003 | Wagner |
| 2006/0059418 | A1* | 3/2006 | Elkady .................... G06F 17/24 |
| 2006/0111990 | A1* | 5/2006 | Cohen et al. ............ G07C 1/10 |
| 2006/0190810 | A1 | 8/2006 | Piersol |
| 2007/0009158 | A1* | 1/2007 | Geva et al. ............. G06K 9/62 |
| 2007/0124665 | A1 | 5/2007 | Jensen et al. |
| 2007/0198910 | A1* | 8/2007 | Jensen et al. .......... G06F 15/00 |
| 2008/0098291 | A1 | 4/2008 | Bradley et al. |
| 2009/0019351 | A1 | 1/2009 | Hitchcock |
| 2009/0204635 | A1* | 8/2009 | McCormack et al. .. G06F 17/30 |

FOREIGN PATENT DOCUMENTS

| | | |
|---|---|---|
| JP | H10254752 | 9/1998 |
| WO | 9720427 | 6/1997 |
| WO | WO97/20427 | 6/1997 |
| WO | 0131511 | 5/2001 |
| WO | 0161517 | 8/2001 |
| WO | 0203239 | 1/2002 |

OTHER PUBLICATIONS http://web.archive.org/web/19980117145007/www.intuit.com/turbotax/- publishing 1998.

Office Action from related U.S. Appl. No. 11/699,955 dated Oct. 29, 2013.

Todd, Chad and Johnson, Jr., Norris L., Hack Proofing Windows 2000 Server, Chapter 6: Encrypting the File System or Windows 2000, pp. 199-237, 694 pages.

Order, *Aatrix Software Inc.*, v. *Green Shades Software, Inc.*, Case No. 3:15-cv-00164-J-20 MCR in United States District Court for the Middle District of Florida Jacksonville Division, Dec. 9, 2019, 40 pages.

Lariviere, Kathleen and Miastkowski, Stan, How to Deal with Taxing Questions, Byte, Mar. 1993, 4 pages.

Defendant *Greenshades Software, Inc.'s* Preliminary Noninfringement and Invalidity Contentions, *Aatrix Software Inc.*, ,_*Green Shades Software, Inc.*, Case No. 3:15-cv-00164-HES-MCR in United States District Court for the Middle District of Florida Jacksonville Division, Oct. 15, 2018, 20 pages.

Technical Note TN1176, Mac OS 9, 65 pages.

TidBits #503, Oct. 25, 1999, retrieved from the internet at https://web.archive.org/web/19991127141001/http:/i NWW.tidbits.com/tb-issues/TidBITS-503.html, 10 pages.

Step-by-Step Guide to Encrypting File System (EFS), Mar. 7, 2000, retrieved from the internet at http://web.archive.org/web/20000816175611/http://www.microsofl.com/WINDOWS2000/library/planning/security/efssteps.asp on May 11, 2020, 19 pages.

Postel et al., File Transfer Protocol (FTP), Oct. 1985, 69 pages.

Gates Ushers in Next Generation of PC Computing with Launch of Windows 2000, Feb. 17, 2000, retrieved from the internet at hllps://news.microsofl.com/2000/02/17/gates-ushers-in-next-generation-of-pc-computing-with-launch-of-windows-2000/, 7 pages.

Defendant *Greenshades Software, Inc.'s* Amended Noninfringement and Invalidity Contentions, *Aatrix Software Inc.*, v. *3reen Shades Softwared, Inc.*, United States District Court for the Middle District of Florida Jacksonville Division, Jan. 31, 2020, 90 pages.

Aatrix Top Pay (v10) Installation/Conversion Guide, 22 pages.

Barbara Bentz, Aatrix Top Pay User Manual, v. 10.0.6, 395 pages.

*Aatrix Software, Inc.* v. *Green Shades Software, Inc.*, 882 F.3d 1121 (2018) Federal Circuit Decision, pp. 1-9.

*Aatrix Software, Inc.* v. *Green Shades Software, Inc.*, Case 17-1452, Document 45, p. 1, filed Jun. 7, 2018, Mandall.

*Aatrix Software, Inc.* v. *Green Shades Software, Inc.*, 890 F.3d 1354 (2018), Denial of Petition for Rehearing En Banc, pp. 1-12.

Dengel, A. et al.: Logical labeling of document images based on form layout features; Proceedings of Workshop on Document Image Analysis, pp. 26-31, Jun. 1997.

Jury Verdict, *Aatrix Sollware Inc.*, v. *Green Shades Software, Inc.*, Case No. 3:15-cv-00164-MMH-MCR in United States District Court for the Middle District of Florida Jacksonville Division, Feb. 27, 2023, 8 pages.

Order, *Aatrix Software Inc.*, v. *Green Shades Software, Inc.*, Case No. 3:15-cv-00164-MMH-MCR in United States District Court for the Middle District of Florida Jacksonville Division, Mar. 8, 2023, 5 pages.

Judgment in a Civil Case, *Aatrix Software Inc.*, v. *Green Shades Software, Inc.*, Case No. 3:15-cv-00164-MMH-MCR in United States District Court for the Middle District of Florida Jacksonville Division, Mar. 8, 2023, 3 pages.

\* cited by examiner

Figure 1 – AUF Builder Record Editor

Figure 2– AUF Column Editor

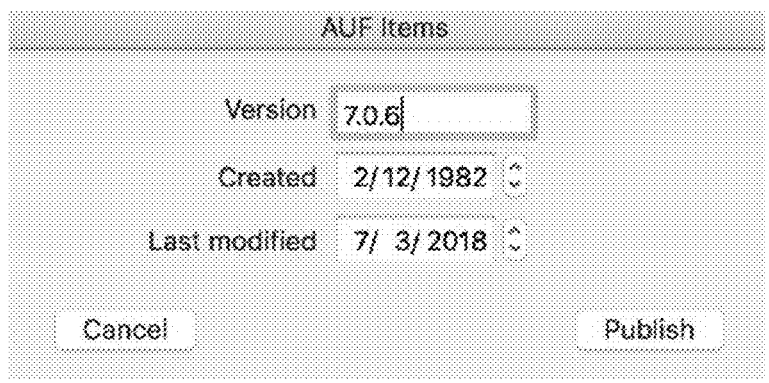
Figure 3 – AUF Publish Window
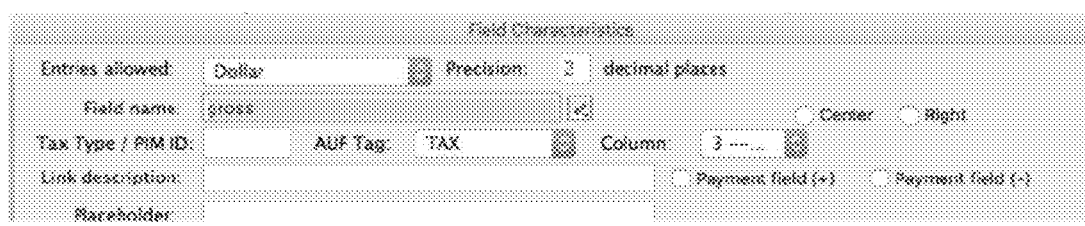
Figure 4 – Field Characteristics Editor in Forms Designer
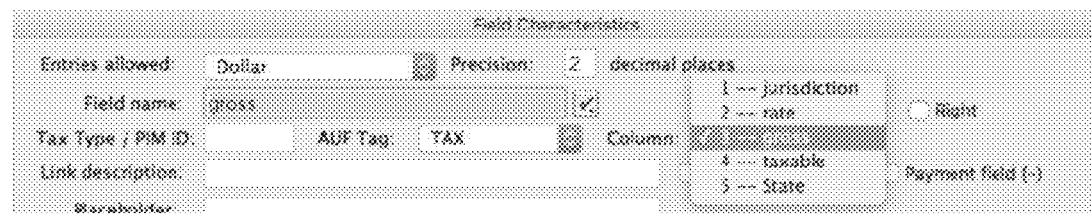
Figure 5 – Column Popup Menu Configured to AUF Tax Tag

AUF XML SPECIFICATION COMPILER

RELATED APPLICATIONS

The present application claims priority to and incorporates by reference United States Patent Provisional Patent Application No. 62/800,865 filed on Feb. 4, 2019.

BACKGROUND OF THE INVENTION

Field of the Invention

The present invention relates to a method and apparatus for automating the process of form creation. In particular, the present invention relates to a method and apparatus for implementing an independent and standardized way to create new data records and data types, and amend existing data records and types, in a computerized form creation and processing system.

Background

The present invention evolved out of an accounting software program that was used from within payroll software programs to fill out certain required forms. However, the first time a programmer needed to update the program as a result of changes to the forms, it took a great deal of time and extensive revision to the program code. This was a substantial obstacle that needed to be overcome, as it took a great deal of time, required a fairly high level of skill to complete, and needed to be done frequently as the forms changed frequently and new forms were added constantly.

Another reason the change process was so difficult and lengthy had to do with the nature of the software used at the time, which consisted of large monolithic programs. The basic components were written into a single huge code block that included a user interface, business logic, and data management sections—all referencing the form. In the monolithic architecture, the code for a form was embedded throughout the business accounting software. As a result, revising a form meant making modifications not only to the segment of source code for the form, but throughout the business accounting software code.

Because changing a form resulted in a change to the monolithic code, it also created the problem of distributing updates to existing users of the software, which could be using copies on remote computer systems that needed to be updated one by one, and while in many applications the code is hosted at a central location, updating and distribution of code changes is not necessarily a trivial task because portions of the code are downloaded to user computers, and hosting does not necessarily mean the code is all on one server at a single location.

Furthermore, changes to the main code structure also requires a great deal of verification and testing to ensure that no errors or bugs are introduced, and that all the components of the system interact with each other as expected. The more changes made to the main code, the more time that was spent in error checking and debugging.

A way was needed to allow for updating existing forms and creating new forms that minimizes the impact on the remainder of the substantive program code.

BRIEF DESCRIPTION OF THE DRAWINGS

FIG. 1 shows a screen shot of an AUF Builder Record Editor.

FIG. 2 shows a screen shot of an AUF Column Editor.

FIG. 3 shows a screen shot of an AUF Publish Window.

FIG. 4 shows a screen shot of a Field Characteristics Editor in Forms Designer.

FIG. 5 shows a screen shot of a Column Popup Menu Configured to AUF Tax Tag.

DETAILED DESCRIPTION OF THE INVENTION

The present invention relates to automating the process of creating and maintaining computerized forms, which in the preferred embodiment is used to prepare tax returns and reports, for example payroll tax forms, but the invention is not so limited.

A number of technological obstacles need to be overcome in order to solve problems addressed by the present invention, and which are described in detail herein-below, but in general the obstacles relate to making improvements to computer related technology, primarily through the implementation of software techniques to improve the functioning thereof. Additionally, overcoming these obstacles involves solving a number of problems that did not exist outside of the context of computer related technological solutions also as described herein-below.

One such technological hurdle involves the fact that the forms must be updated frequently, and in some embodiments the forms are provided to the appropriate governmental entity for approval and must be edited to each agency's strict requirements at least annually. These and other technological hurdles are described in greater detail below.

Broadly, the invention is part of a programing construct and physical computer apparatus used to create and distribute forms, and can be divided into several general components, three of which are helpful to discuss in some detail herein, these being: a form file; a data file; and a forms viewer, all as described in additional detail below. The foregoing work in partnership with, and receive data from a plurality of third party software programs, preferably (but not limited to) accounting software programs.

The form file is a programing construct that includes information that allows the computer system to create or duplicate a form. The form file is not a file that contains an image of the form (an image file), but instead contains computer code by which a computer-generated form is created so that when completed, it will match the original form (whether a paper or electronic form—such as a pdf) within the level of precision required. This is a process that cannot be completed by merely scanning or digitally capturing an original form (if an original form even exists).

The form file will include computer executable instructions and/or information for placing text that appears on the form such as the form title, instructions for filing out and/or mailing the forms, names of various fields on the form, and the like. The form file also includes computer executable instructions and/or information for placing drawn elements such as lines, shapes like circles, triangles, boxes, shading, and other non-text items that appear on the form. The form file can be manipulated by a user (or form designer) as necessary to duplicate the original, or create a new form, such as for example shifting the positions of text and drawn elements, changing characteristics such as font, color, size, line widths, formatting, and other changes. A forms designer program is provided for this purpose, which also includes features and capabilities for further editing, designing, modifying, and use of the forms created—for example, forms can be linked in the case of multiple page forms, or one form can be linked to another form in the event they share related data, form values can be updated in real time as data is entered, and mathematical operations can be performed on form fields. All of this information is captured in the form file in the form of programing constructs, that can be executed by the computer to create the form.

Any image of the original form if used as an aid to create the form file, is discarded after the form file is created. The form file as stated is not an image file.

The form (and its form file) can also be created from scratch without the use of an image file, but can instead be designed from scratch by allowing a user to simply place any desired text and drawn elements, such as lines, boxes, circles or triangles, or other items so as to duplicate the original form—or create a wholly original form. In this embodiment, a user can create a form file without the aid of any underlying image, background, or template form of any kind. The user can piece together the elements, which are then converted to programming and other elements stored in the form file for use as described herein.

In other settings, the form may already exist in an electronic form, or semi-electronic form. Many agencies, or other sources of forms, supply forms in formats that are already somewhat amenable to computer usage, such as pdf files (or other similar formats). In this case, the existing electronic form can be used in connection with various programs and interfaces to create a form file from the information in these types of forms; however, the form file remains a distinct element from the original source.

Thus, the form file includes all the computer instructions and programming, as well as data such as text and drawn elements, to duplicate an existing form or create from scratch a new computer form. This file is then available for use by the rest of the system as described herein.

The second general component referenced above is the data file, which includes the data that is processed by and placed on the forms. The present invention operates on data that is typically provided from a variety of proprietary third party software applications, such as accounting: software and payroll programs, and the like. Each program can have its own internal structure for the data, which commonly is proprietary to the software provider. In order for the present invention to operate, the data needed for the forms needed to be in a standard format, but no standard existed, and so one was created.

The standard is known as an AUF file (Aatrix Universal File). The AUF file contains the data that will populate the fields of the forms represented by the form files, Fields are areas on a form that need to be filled in with alphanumeric or other information, either automatically taken from another program, such as the payroll application, calculated in response to other information on the form, or manually filled in by the user. The AUF file contains the information from the accounting and payroll applications.

In its preferred embodiment, data from a user application is placed into the AUF file, which has been prepared in accord with an IT data file specification. The AUF file can then be used to auto-populate information appearing in the forms, instead of having the information entered manually by a user. Typical data in the AUF file can include, without limitation, data such as: Company Name, Address, Federal and State ID Numbers, Phone Numbers, Contact Name, Contact Address, and Contact Phone Number. Also, the AUF file can include data than can be used to fill in an employee's information, including the Employee's Name, Address, Phone Number, Wages, Pay Rates, and individual Paycheck Amounts including Deductions, Employer Paid Items, and Types of Income. All the paycheck information can be split out to individual days, or added together to get many different totals for Weekly, Biweekly, Monthly Semi Monthly, Quarterly, Semi-Annually, or Annually to mention a few.

The third main component is the viewer program. The viewer program operates on a data file (such as the AUF file) and the form file to perform calculations or operations, to allow the user of the data processing system to review and change the data, and to create/complete the forms.

Rules and calculations can be performed in connection with the data in the AUF file. In real time the numbers on the form are updated or changed based on the data that is entered in the form, by programming statements acting thereon. Calculations and rule conditions are performed immediately and dynamically in response to user input or data calculations. This has the benefit of allowing the user to immediately see the results of his or her data entry, and assisting in the production of accurate and complete forms.

Additionally, "If . . . Then . . . Else" rules can be applied to manipulate data on the form, and other rules can be applied across fields of a form. Scanlines or barcodes can be analyzed and acted on, or created, as well.

In addition, the program has the ability to securely (using encryption algorithms) transmit forms/reports with data, as well as other critical company information, across the Internet to an e-file Server.

With the above structure in mind, the present invention has implemented a solution to technological problems related to maintaining the AUF file that is used by the computer system to duplicate and fill out forms. The nature of the AUF file, and some of the problems solved by using it, are described above; however, there are additional issues that arise from the use of a standard data structure in the context of forms that change over time.

The additional obstacles have to do with the various record and data types used with the forms and the data—namely, they change over time too. In particular, one of the challenges of implementing new form types is being able to incorporate new record and data types into the existing AUF and form file structure, and allowing those new record and data types to be processed by the remainder of the program without having to code the change into the main program architecture and source code. These type of changes happen frequently, and without a solution to this problem a great deal of time is needed to make code changes, to verify and test the code changes, and the level of expertise needed for these tasks is relatively high.

For clarification purposes, a data type, described in detail below, generally refers to a classification that specifies which type of value a variable has and therefore what type of mathematical, relational, or logical operations can be applied to it without causing an error. A record type is a collection of data types that together represent the information necessary to perform a function or task, or completely capture a group or set of data. For example, a data type needs to be defined to allow data to be read into a data field defined in a form file so that the program manipulating the data knows what can and cannot be done with the data, and how to interpret the data.

Creating new data types and record types used by the AUF file and form files previously required the following steps: identify the nature of the data needed and its characteristics based on its use/function (for example, determine whether data used in a form is text, numeric, or a date—each being an example of a different data type used on a form); create and document a field name for this new data to be used for data mapping purposes; modify all form files that require the new data with the new correct field name and update any other attributes relating thereto; have a programmer modify all references in the forms viewer program code to properly interpret and render the new data type, and identify any enhancement or processing request for the new data that need to be supported in the forms viewer; program the forms viewer application code to read the new data point, validate it, and process it on the form in the proper location or in accord with other appropriate instructions; once the new data point is implemented in the forms viewer, online documentation and the AUF specification file (XML, file) need to be manually updated to reflect the new data as well and its characteristics so that third party applications can properly export the data; testing and quality assurance processes need to be conducted to ensure that all changes made with regard to the data point are correct and that no other problems occur; once the new forms viewer code is certified for release, the third party accounting software platforms that provide the AUF data files are informed of the change to the AUF specification so they can support the new data point and the updated forms viewer is released to the general public.

A number of problems result from the above approach: the process is reliant on relatively high skilled programmer involvement—adding new data points required the attention of a software engineer capable of not only modifying the source code, but that has a high level of knowledge of the entire system to understand the scope of the changes needed; modifying the forms viewer code represents the risk of introducing errors or bugs into the application code; changes to the code require all users to obtain and install the new update; the time between the identification of a new data point and full roll out is lengthy—a minimum of several weeks, but more likely to be a number of months; and third party providers of accounting software needed to implement the new data point, even if they do not use the affected forms, or they would fall out of compliance with the AUF specifications. Of course, this needs to be repeated every time there is a change, and changes are constantly required.

These and other problems and technological obstacles are substantially overcome with the present invention. As described above, the present invention utilizes the AUF data specification which allows third party developer partners to provide data in a format that can be used to populate the data fields in the various forms represented in the forms files with data from the third party partner's application. As new forms are released, or existing forms are updated with new data fields, if they require or allow for new data types, the AUF specification must be updated, published, and implemented, and in addition the forms designer and forms viewer programs must be taught how to handle the new data type. In other words, the programs have no idea how to handle data in a data field unless it knows its data type and understands the rules applicable thereto, which had required updating the source code in every location that might have to process in some manner said data.

More specifically, in the past, if a new data type was required for data record used in a form, the user who was designing the form would identify the appropriate field name, specify what the data point was (giving it a name, data type [i.e.: Char, Integer, Decimal, Date] minimum and/or maximum size and a description,) update the AUF spec with the new information, submit a change request to the engineers that maintains the forms viewer and forms designer to update the code in the programs to handle the new data type, and once it was implemented in code and released publish the new AUF spec. This process could take many months to accomplish as explained above.

The present invention substantially eliminates these drawbacks. The present invention handles at least three possible changes that might be made to the AUF spec relating to record types and data types:

1) The addition of one or more columns, representing new data points, that can be added to an existing record type (as an example, adding a column for "Foreign address" to the existing "CMP" (company data) record type). Again, the new data point has to have a data type associated therewith.

2) The addition of a completely new record type, having several associated data types, (as an example, a "TAX" data type for data that is necessary for sales tax reporting forms). In this instance, a new record type is created and one or more columns, representing data points within the record, are added. Each data point is of a certain data type.

3) Deprecating an existing record type. If the data in a column is no longer needed or has been supplanted by another column the data is deprecated, or marked to be ignored. For compatibility, columns are never deleted, they are simply marked as being deprecated and those data points are ignored in future releases of the forms viewer; however, that requires updating the forms viewer program with this new information.

One of the necessary steps in implementing new record types, or adding data types to an existing record type, is to provide a way for the elements of the program that need to use the new data to get the data out of the AUF file, after the record is created and/or updated. If the change is a single data point added to an existing record type, as in example 1 above, the code that needs to be inserted into various spots in the forms viewer (or elsewhere) is along the lines of:

```
ReturnAUFChunk(theLine, 4, utilStr);
g_formsToFill→SetFieldContents("\pDPhone", utilStr, 0);
```

In this code snippet, the AUF data file includes a record with a variable "theLine" which stores data of a certain type, and the function "ReturnAUFChunk" returns the contents of the fourth column of the data record into the variable "utilStr." The second line allows the forms viewer to place the contents of "utilStr" into a form field called "DPhone".

If the change is a new record type, as in example 2 above, a new function of the type shown below needs to be added to the forms viewer, which would be called when the AUF parser encountered the new record type in an AUF data file:

```
HandleTAXLine(*theLine)
{
  Str255 utilStr;
  ReturnAUFChunk(theLine, 2, utilStr);
  g_formsToFill→SetFieldContents("\pTAXLocality",
    utilStr, 0);
  ReturnAUFChunk(theLine, 3, utilStr);
  g_formsToFill→SetFieldContents("\pTAXRate", utilStr,
    0);
  ReturnAUFChunk(theLine, 4, utilStr);
  g_formsToFill→SetFieldContents("\pTAXGross", util-
    Str, 0);
  ReturnAUFChunk(theLine, 5, utilStr);
  g_formsToFill→SetFieldContents("\pTAXTaxable", util-
    Str, 0);
  return true;
}
```

As can be seen in that code snippet, the function is a series of calls that go through all of the columns of the new record type and place the data in the appropriate fields on the form.

The above code example is added to every program module in the forms viewer (or elsewhere) responsible for reading in the AUF file, and placing the data onto the appropriate forms.

The programing code above, of course, only works if the data types and record types are already defined, and the AUF files contain the actual data. Thus, the above is a necessary but not sufficient set of changes to the program code needed to implement any of the three types of changes to record types described above. The actual data records need to be created, or updated to support the new data records and data types. In the past this required the painstaking and time consuming process described above of editing the program to create new structures, or to find every instance of the old structures and amend them.

Simplifying this process required support for new data types, and record types. Tools were developed that allowed the previous "find and fill" process to be centralized and generalized, and pulled away from the forms viewer and designer programs, and more efficiently implemented with unique specific tools.

As part of this process, two new attributes were added to basically all AUF form fields: a record type attribute; and a column attribute. These attributes can be used by the new tools to build new data types and record types into the AUF structure. Both attributes are selected from drop down menus that are populated by a thin client application that accesses a database of such attributes stored on a server. This functionality allows the user of the forms designer tool, at the time that the forms are designed and the forms file created, to define the specific data and record types that are used to populate form fields when the forms viewer merges the form with the AUF data file.

An additional tool, the AUF builder, is used to create new, or modify existing, record types within the AUF database file by providing a way to add to, and modify, a library of available AUF record types and data point descriptions available for use in the form file creation process. These record types, once added or modified, are then automatically available for use in constructing a form file, and upon merger with the AUF file hold data used in the form viewer for filing out the forms—the previous process of editing the program code to create new structures, or to find every instance of the old structures and amend them is required anymore.

Figures 1, 2:
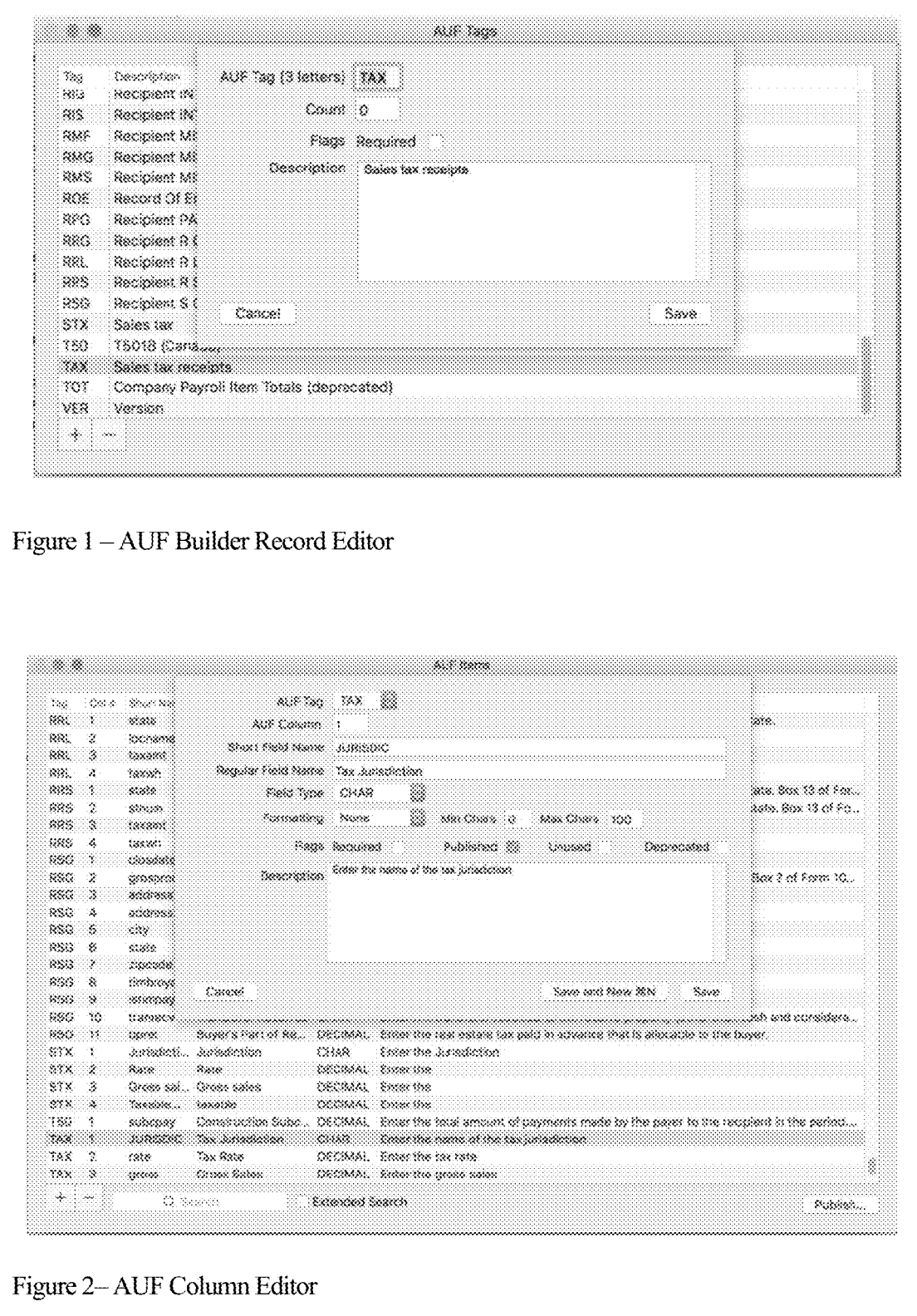

A screen shot of the AUF builder is shown in FIG. 1. In the window shown in FIG. 1, the user enters the record type tag (AUF tag), a three letter code (TAX in this example), the maximum number of records with this type that can appear in a form file (0 indicating no maximum, 1 being the only other commonly used value for "Count"), an indicator whether the Record is required (meaning that the forms viewer will reject the AUF data file if this record is missing), and a description of what the AUF tag represents.

Once the AUF tag has been created, the user may use the next AUF Builder tool shown in FIG. 2 to further specify the structure of the created record type having this AUF tag, which comprises a plurality of columns where each column is designed to hold data points of the specified data type.

In the window shown in FIG. 2, the user creates the record type associated with the AUF tag (TAX in this case), column by column. The user first selects the AUF tag specifying a record type from the list shown in the background (the newly created TAX tag having been selected in FIG. 2), and provides the following information.

1) AUF column—the physical column number associated with each data type in a data record where the data will go.
2) Short field name—limited in size to eight characters, for use in databases and other instances where field size is limited.
3) Regular field name—long field name.
4) Field/Data type—CHAR (for text), DATE, INTEGER, DECIMAL, or N/A.
5) Formatting—Only applies to CHAR fields, options are none, FEIN (Federal Employer Identification Number,) PHONE, SSN (Social Security Number) or ZIP (Zip code). This allows the forms viewer to correctly format the field when it is populated.
6) Min Chars/Max Chars—Only applies to CHAR fields, allows the user to specify field content lengths.
7) Min Value/Max Value—Only applies to INTEGER and DECIMAL fields, allows for range checking.
8) Precision—Only applies to DECIMAL fields, forces decimal precision (Example, with precision of 2, data that was "1.23456" would be entered on the form as "1.23".
9) Required—Flag to indicate that this data point must be populated or the AUF data file will be rejected by the forms viewer.
10) Published—This field is part of a previously released AUF specification.
11) Unused—Field column that should be left blank.
12) Deprecated—This field is no longer used by the Forms Viewer and will be ignored.
13) Description—long description of the field, for use when generating documentation.

The process can be repeated for multiple columns for the particular AUF tag as needed to fully define the record type. When the record type creation or modification of the AUF database is complete, the user clicks the "Publish . . . " button on the AUF Items window (FIG. 2) displaying the screen shown in FIG. 3.

As shown in FIG. 3, the user provides the version number and has the opportunity to modify the two dates that are embedded in the published AUF specification files (spec.xml). After reviewing and clicking publish, the tool generates the XML, file for the new AUF specification and the HTML files that are published for third party partners' reference.

Once the AUF database has been updated, the new or updated AUF record type is available to be assigned to a field of a form in the forms designer program, and then become part of a form file, which is used by the forms viewer program to construct the form file, wherein once the form file is merged with the AUF data the fields of the form will then be filled with data as appropriate. For example, the field assigned the AUF Tag TAX is shown in FIG. 4 as it is displayed in the forms designer program.

In the window shown in FIG. 4, the user can select a record tag from the "AUF Tag" dropdown menu ("TAX" is selected, in this instance). Once the tag has been chosen, the column popup menu configures itself to list the columns that are applicable for data types associated with the selected AUF tag data record as shown in FIG. 5. Each column having been configured as described in reference to FIG. 2 above.

When a column is selected from the menu, the forms viewer uses the column description established in the AUF Builder as described above (such as data type, maximum or minimum characters, etc.) to configure some of the selections in the Field Characteristics editor.

After correctly assigning AUF tags and columns, the user saves the configuration to the applicable form file, and the normal testing and release procedures are followed, and any third party partner who chooses to support the new data points simply adds them to their existing AUF data file per the AUF specification, and the fields are automatically populated correctly, without any changes made to the forms viewer or forms designer applications.

This system involves the following components: personal computers, network servers; the AUF builder program to view, edit and publish AUF record type tags and columns of data points; the AUF builder thin client support module which is a bridge between the AUF database file and the forms designer program to circumvent making changes to the database; the forms designer program, which assigns the AUF tag created or amended by the AUF builder to fields on a form; and the forms viewer program which merges the form file created by the forms designer with the AUF data file to populate the form automatically.

The benefits of the present invention are numerous and described herein. Substantial technological problems are overcome including relieving software engineers of the problem of implementing code changes across a wide array of programming modules in order to create new records, or new data types and fields in existing records all associated with the task of forms creation. The present invention implements a process that previously took weeks or even months, and required manual manipulation of source code and databases, which can now be accomplished within a matter of minutes by individuals with relatively lower skill levels than before. Previously, data points were mapped to field names, and field names assigned to forms. A change thereto required hunting through myriad of code in the forms designer, forms viewer, and other supporting modules to make changes. The present invention creates a specialized independent tool to create and amend record types, which can then be referenced simply referring to an AUF Tag. The forms viewer and forms designer can then utilize any record types by its AUF tag, essentially without any other information. Modifications to the AUF specification do not impact existing functionality, limiting testing to a simple verification that fields are being properly filled out with data from the AUF data file.

The above specification and accompanying Figures are for illustrative use only. The scope of the present invention is defined by the following claims. The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. Those of ordinary skill in the art that have the disclosure before them will be able to make modifications and variations therein without departing from the scope of the invention.

The invention claimed is:

1. A method of implementing and updating record and data types used to create a form, comprising:
   providing a computer system wherein the method is carried out by computer executable code operating on the computer system;
   providing a form file template defining the characteristics and attributes of one or more fields available for use in a form file created from the template, wherein the form file is comprised of programming constructs that upon execution to create a form;
   providing a data file having a structure comprised of record types and data types for storing data used to populating a form created from the form file;
   creating a record type in the data file and an attribute associated therewith, to be used to provide data from the data to the one or more form file fields in the template; and
   assigning a column attribute to the record type to be used to provide data from the data file to the one or more form file fields in the template.

2. The method of claim 1 where the record type attribute comprises a tag, a count, and a description of the type.

3. The method of claim 1 where the column attribute defines the characteristics of the attribute.

4. The method of claim 3 where the characteristics comprise the column in the record to which it belongs.

5. The method of claim 1 where the record type has multiple column attributes assigned thereto.

6. The method of claim 1 further comprising the step of documenting the creation of the record type.

7. The method of claim 1 where the record type is a new record type.

8. The method of claim 7 further comprising the step of assigning the new record type to the form file.

9. The method of claim 7 where the assignment step is carried out using a field characteristic editor.

10. The method of claim 7 further comprising the step of selecting a column for the new record type and assigning it to the form file.

11. The method of claim 1 where the form file comprises computer executable instructions to create or duplicate a form.

12. The method of claim 11 where the form created or duplicated by the form file is a tax form.

13. The method of claim 1 where the record type is a deprecate record type to indicate that an existing field in the form file is to be ignored.

* * * * *